April 2, 1940.　　　L. R. BUCKENDALE　　　2,195,509
MOTOR VEHICLE DRIVE
Filed March 29, 1935　　　3 Sheets-Sheet 1
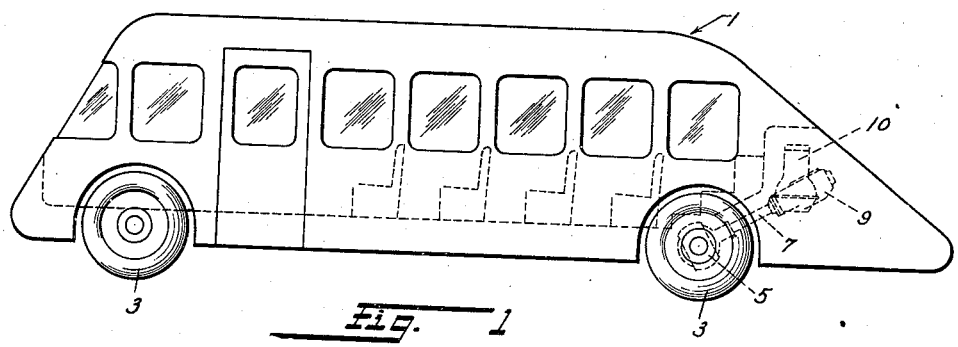
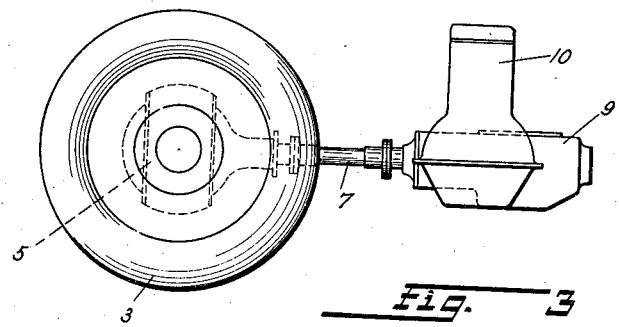
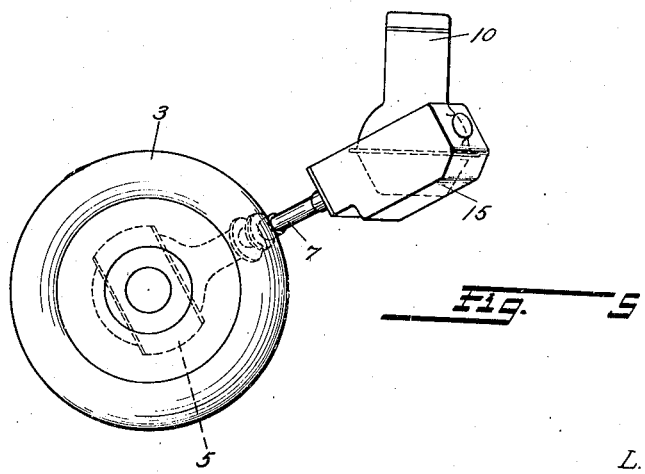
INVENTOR.
L. Ray Buckendale
BY
Strauch & Hoffman
ATTORNEYS April 2, 1940.   L. R. BUCKENDALE   2,195,509
MOTOR VEHICLE DRIVE
Filed March 29, 1935   3 Sheets-Sheet 2
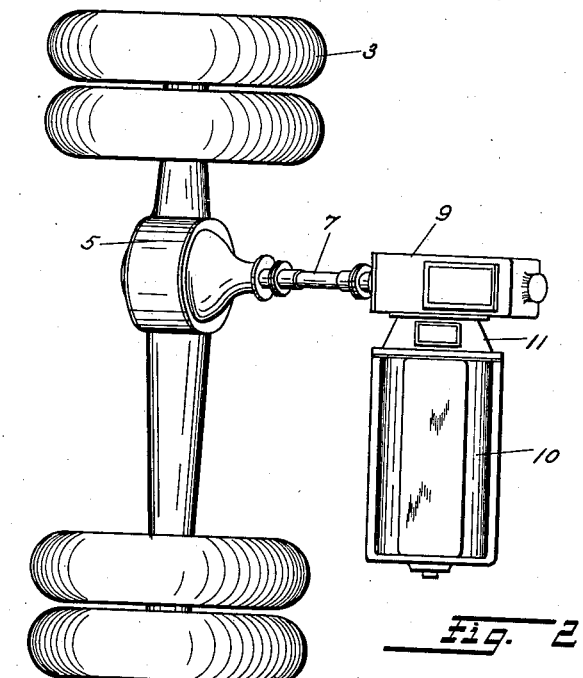
Fig. 2
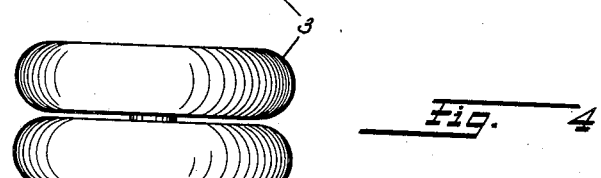
Fig. 4
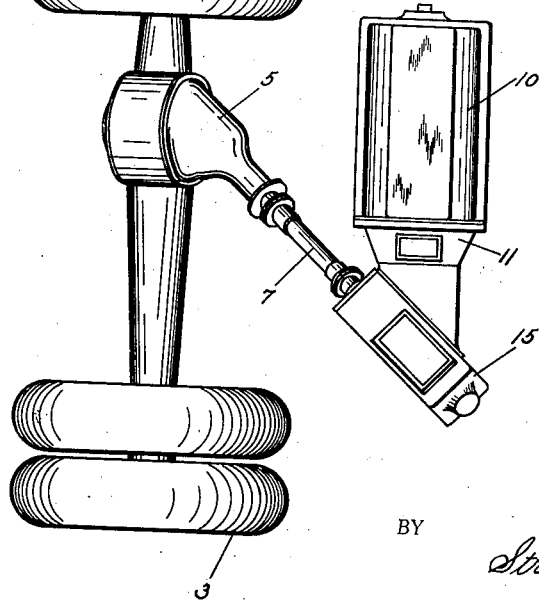
INVENTOR.
L. Ray Buckendale
BY
Strauch & Hoffman
ATTORNEYS April 2, 1940.                L. R. BUCKENDALE                2,195,509
                              MOTOR VEHICLE DRIVE
                             Filed March 29, 1935              3 Sheets-Sheet 3

INVENTOR.
L. Ray Buckendale
BY
Strauch & Hoffman
ATTORNEYS

Patented Apr. 2, 1940

2,195,509

UNITED STATES PATENT OFFICE 2,195,509

MOTOR VEHICLE DRIVE

Lawrence Ray Buckendale, Detroit, Mich., assignor to The Timken-Detroit Axle Company, Detroit, Mich., a corporation of Ohio Application March 29, 1935, Serial No. 13,753

5 Claims. (Cl. 180—54)

This invention relates to driving mechanisms, particularly such as may be used in rear motor mounted vehicles.

In vehicles, such as buses, where maximum useful floor space is the prime consideration, the power plant, or prime mover of the vehicle is placed in the rear of the rear axle. In order to prevent too great an overhang, such a prime mover, or engine is placed with its longitudinal axis at right angles to the longitudinal axis of the vehicle. Under such conditions the method of arranging the necessary component parts, such as clutch, transmission and propeller shaft, presents a complicated problem. There are two arrangements which, up to the present time, have had the widest use. In both of these arrangements the longitudinal axis of the transmission coincides with and is an extension of the longitudinal axis of the engine and clutch.

In the first of the arrangements, the engine, clutch and transmission are placed in line transversely of the vehicle. A standard transmission may be used, but a special set of acute angle bevel gears at the power out-put end is necessary, as it is evident that the power out-put end of such an arrangement will be very close to the side wall of the vehicle body. Since the rear axle driving gears must necessarily be placed between the wheels, located at the ends of the axle, the propeller shaft from the power out-put end of the transmission to the rear axle differential carrier must be angularly placed with respect to the longitudinal axis of the vehicle. With such an arrangement the gear set at the power out-put end of the transmission and the rear axle driving gears must be other than the conventional ninety-degree bevel gearing. It is readily seen then that with this arrangement the distance from the end of the motor to the power out-put end of the transmission is necessarily very great, so that it presents certain restrictions on the width of the vehicle.

The second arrangement above-mentioned, likewise has the engine, clutch and transmission in line transversely of the vehicle, but in this case a special transmission incorporating a counter-shaft, permanently geared, parallel to, but below the main shaft, is used. The power take-off of this transmission is located at the lower portion of the transmission at the end thereof adjacent the clutch housing. In other words, the power take-off gearing is attached to the counter-shaft and at the end of the transmission opposite to the end where such gearing is usually located. With this arrangement, ninety-degree bevel gears may be used at the power take-off of the transmission and in the rear axle carrier and the overall length from the motor fan to the end of the transmission is not as great as in the first arrangement described. The disadvantage of this second arrangement, however, is that when the vehicle is in high or direct drive, the drive must necessarily be through a meshing set of gears between the main shaft and counter-shaft of the transmission. In the first arrangement described, when the vehicle is in direct drive, there are only two sets of gears through which the drive is transmitted; first, the set of gears in the power take-off end of the transmission and second, the set of gears in the rear axle carrier. In the second arrangement there are three sets of gears through which the drive must go; first, the set between the main and counter-shafts of the transmission, second, the set at the power take-off end of the transmission, and third, the set in the rear axle carrier.

While this second arrangement does not present the overall power plant length disadvantage to the same degree as the first design, it is only shortened by the space taken up by the power take-off gearing. In other words, in order to conserve this overall length, the user of this second arrangement penalizes himself in the amount of a special transmission and an extra set of gears.

My invention contemplates the elimination of the above-noted disadvantages and has as a primary object to provide a novel power plant arrangement embodying a tansmission whose longitudinal axis is other than parallel to or coincident with the longitudinal axis of the driving motor.

A further object of this invention is to provide in a rear motor mounted vehicle a novel arrangement of motor, clutch and transmission such that standard rear axle gearing may be utilized.

Another object is to provide an exceedingly compact arrangement of motor, clutch and transmission in a motor vehicle whereby no penalties in body width or design are encountered.

Still another object of my invention is to provide a novel unitary power plant arrangement in which the vehicle driving engine and the change speed transmission are connected together as a unit with the transmission mechanism disposed at one end of the engine in such a manner that the width of the entire unit is but slightly greater than the width of the engine.

A still further object of the present invention is to provide a novel driving connection between a change speed transmission mechanism and internal combustion engine whereby the engine and transmission mechanism can be associated together in a novel manner as a unit. A further and related object is to provide for connection of the transmission housing in a novel manner to the housing for the clutch in a unitary power plant arrangement so that the transmission housing may be turned at any angle.

A further disadvantage of the transmissions of the prior arrangements heretofore discussed, is that the power take-off gear set must be designed to transmit the extreme power of low gear. This necessitates high capacity gears with a resultant increase in size of the related parts. The bevel gear set of my transmission is located at the power in-put end in a novel manner and hence has only to be large enough to take the motor torque. This arrangement, which is still another object of my invention makes possible the use of a comparatively small size bevel gear set which is conducive to greater compactness and an increased safety factor.

A still further object of my invention is to provide a novel change speed transmission having a power in-put shaft angularly disposed with respect to the transmission main shaft and counter-shaft.

Still another object of my invention is to provide in a change speed transmission, a novel bevel gear drive and means to adjust the meshing engagement of the gears comprising the drive.

A still further object of my invention is to provide in a change speed transmission, a novel counter-shaft and counter-shaft bearing support.

The above and further objects will appear from a study of the following description when taken in connection with the accompanying drawings wherein—

Figure 1 is a diagrammatic view in side elevation of a vehicle, illustrating the arrangement of a driving mechanism incorporating my invention;

Figure 2 is an enlarged plan view of the driving mechanism of Figure 1;

Figure 3 is an enlarged elevational view of a modification of the driving mechanisms of Figures 1 and 2;

Figure 4 is a plan view similar to Figure 2 illustrating a modification;

Figure 5 is a side elevational view of the modification illustrated in Figure 4;

Figure 6:
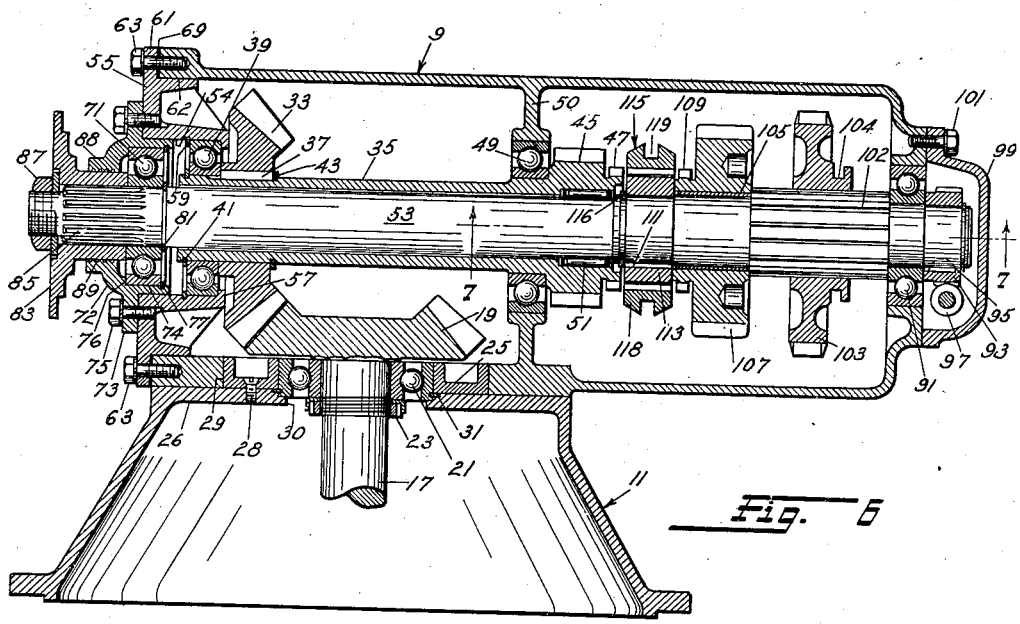
Figure 6 is a horizontal sectional view of the transmission of Figures 1, 2 and 3.

While I have illustrated my invention in connection with a vehicle of the bus type, it is to be understood that it is in no wise to be limited to such use.

Referring now to the drawings wherein like reference characters refer to like parts wherever they occur and with particular reference to Figure 1, the reference numeral 1 indicates a vehicle body, which is supported by front and rear road wheels 3. The vehicle is driven by means of power supplied to the rear wheels 3 through the rear axle 5, propeller shaft 7 and the transmission mechanism within the housing 9. The propeller shaft 7 is provided with universal joints of any approved design and the necessary slip joints permitting extension of the propeller shaft as the axle 5 follows irregularities in the roadway. Driving power is imparted to the transmission mechanism from the motor 10 through a clutch of conventional design located within the clutch housing 11. It is to be noted (considering Figures 1 and 2) that the longitudinal axis of the transmission and propeller shaft is at right angles to the longitudinal axis of the motor and rear axle and at an angle with the horizontal. It is evident that the position of the motor may be changed radially with respect to the longitudinal axis of the rear axle without disrupting the combination. For instance, the motor and transmission may be so placed that the propeller shaft 7 would be substantially horizontal or, so that the propeller shaft would be almost vertical. The location of the motor and transmission vertically will depend upon the space provided therefor in the body of the vehicle.

Figure 3 illustrates the relation of the parts when the axis of the propeller shaft is in the same plane as the axis of the rear axle and motor.

In the modification illustrated in Figure 4, instead of the longitudinal axis of the transmission being at right angles to the longitudinal axis of the motor, the transmission 15 is arranged with its longitudinal axis at an acute angle with the longitudinal axis of motor 10. It may be desirable in vehicles where space is at a premium, to have the longitudinal axis of the transmission and propeller shaft at an angle with the longitudinal axis of the vehicle. This may also be desirable to obtain a longer length of propeller shaft, in order to acquire greater flexibility.

I have illustrated in this modification (see Figure 5) the axis of the propeller shaft and transmission as being at an angle with the horizontal. It is understood that said parts, as in the case of Figures 1, 2 and 3 may be in the same horizontal plane.

From the above discussion, it is evident that the overall length of the motor, clutch and transmission of my invention is greatly reduced over prior art designs and also the width of these parts associated as a unit in accordance with my invention is but little greater than the width of the motor. Where in prior designs the use of a propeller shaft at an angle to the longitudinal axis of the vehicle is necessary, I can use a propeller shaft parallel to said axis and thus use standard ninety-degree bevel gearing. In cases where prior devices have great difficulty in housing their motor, clutch and transmission within the vehicle body, I can do so with ease by having the propeller shaft and transmission axes at an angle with the longitudinal axis of the vehicle.

Figure 7:
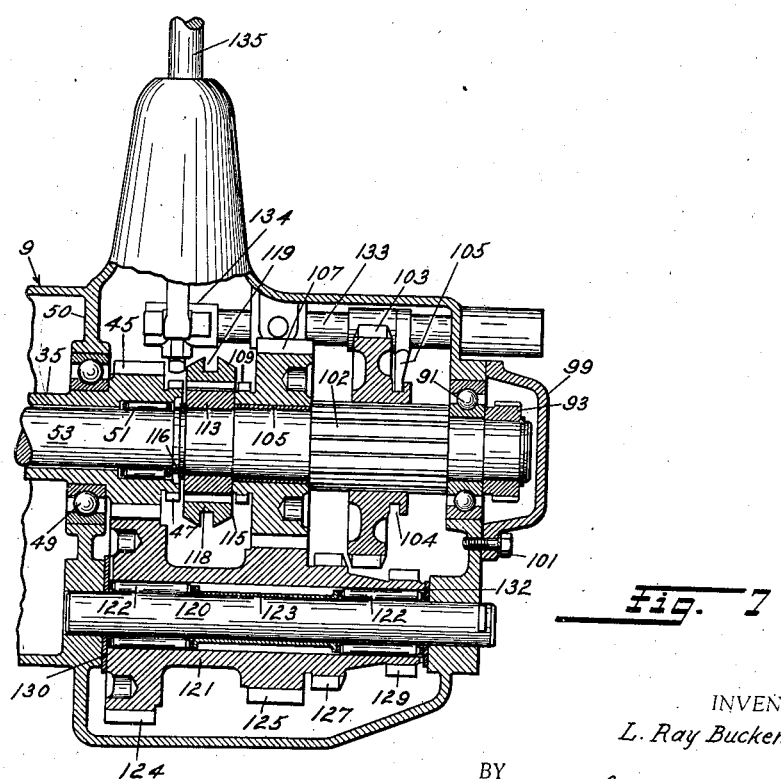
Figure 7 is a sectional view taken substantially upon the line 7—7 of Figure 6.

Referring now to Figures 6 and 7, and for the present to Figure 6, the transmission of my present invention is drivingly connected to the clutch of conventional design located within the housing 11 by means of a shaft 17. Said shaft has on its outer end and integral therewith a bevel gear 19. Said gear and shaft are journaled in a bearing 21, the inner race of which is clamped on the shaft 17 by means of nut and lock washer assembly 23, which is screwed onto threads provided therefor on the shaft. The bearing 21 is piloted in a pilot ring 25 which is secured to an inwardly extending circular flange 26 of the clutch bell-housing 11 by any suitable means, such as bolts 28. The transmission casing 9 is removably secured to the clutch bell housing 11 by any suitable means and is accurately located with respect thereto by the exterior face of the ring 25 which fits within a circular opening 29 in the housing 9. It will thus be seen that the housing 9 may be turned on the ring 25 so that its axis can lie in any desired position with respect to motor 10.

The flange 26 has a central aperture 30, the inside diameter of which varies in steps. The smallest diameter of the aperture 30 is less than the outside diameter of the bearing 21. The diameter of the middle portion of the aperture is substantially the same size as the outside diameter of the bearing and the diameter of the third portion is slightly larger than said bearing. The outer race of the bearing 21 is provided with an annular groove adapted to receive a locking ring 31 which is adapted to fit into the largest diameter of the aperture 30 and is of such thickness that when the pilot ring 25 is secured to flange 26, it will be snugly locked in place. It is by reason of this locking ring 31 that bearing 21 is positioned relative to the outer facing of the clutch bell-housing 11 and which in turn positions the bevel gear 19.

Meshing with the bevel gear 19 and at right angles thereto is a second bevel gear 33 which may be of the same size and have the same number of teeth as the bevel gear 19, or it may be larger having more teeth, or smaller with less teeth, depending upon design requirements. The gear 33 is provided with an internal bore in its hub portion so that it may be received upon a sleeve 35. The gear 33 is non-rotatably positioned on the sleeve 35 by suitable means, such as a key 37. Adjacent the outer side of the gear 33 is a bearing 39 the inner race member of which is received upon the sleeve 35 substantially in abutting relationship with the hub of the gear 33. Adjacent the outer side of the bearing 39 and the inner side of said gear 33 circular grooves are provided in the sleeve 35 for the insertion of locking rings 41 and 43 respectively. It is by means of said locking rings that the gear 33 and bearing 39 are positioned laterally upon the sleeve 35.

The opposite end of the sleeve 35 is formed to provide gears 45 and 47. It will be understood, however, that gears 45 and 47 may be separate parts secured to the sleeve in a suitable manner if required by conditions of individual design. Adjacent the gear 45 is a bearing 49 the inner race member of which is piloted on a slightly enlarged portion of sleeve 35. The outer race member of the bearing 49 is carried in a circular boss of a partition 50 in the transmission casing 9. The teeth of the gear 47 are of less width and of a smaller diameter than the teeth of gear 45 and are provided for a purpose which will be evident hereinafter. The inside diameter of the sleeve 35 is substantly uniform throughout its length, but is enlarged at its gear end for the insertion of a bearing 51 which rotatably supports the sleeve 35 on a shaft 53 the latter serving as the main shaft of the transmission.

The bearing 39 for the sleeve 35 is seated within the cylindrical interior 54 of a bearing cage 55 and is retained in position by means of an internal shoulder 57 at the inner extremity of the cylindrical interior of the cage and a lock ring 59 inserted into an annular groove. The cage 55 has an outer radial flange 61 and a cylindrical portion 62. The flange 61 is provided with a series of circularly spaced apertures for the insertion of cap-screws 63 which are threaded into threaded apertures provided therefor in an end of the transmission casing 9. The cylindrical portion 62 fits into the end of the casing 9 and serves to position the parts concentrically. The intermeshing of the bevel gears 33 and 19 is controlled by adjusting the bevel gear 33 longitudinally of the transmission casing by the insertion or renewal of shims 69 between flange 61 and the end of transmission casing.

The end of the main shaft 53 adjacent the gear 33 is journaled in a bearing 71 carried by a bearing cage member 72. The cage member 72 includes a radial flange 73 and a cylindrical portion 74 within which the bearing 71 is received. The cylindrical portion 74 of the cage member fits within the interior 54 of the bearing cage 55. A circular series of capscrews 75 serve to secure the radial flange 73 to the bearing cage 55. The bearing 71 is retained in position within the cylindrical portion 74 by means of a shoulder 76 and a lock ring 77. A lock ring 81 is seated in a groove in the shaft 53 at one side of the bearing 71 and the other side of said bearing abuts the hub portion of a propeller shaft companion flange 83. The companion flange is non-rotatably secured to the main shaft 53 by any suitable means, such as splines 85. The companion flange and the bearing 71 are longitudinally secured on shaft 53, against lock ring 81 by means of nut and washer assembly 87. It is to be noted that the addition or substraction of shims 69, moves the shaft 53 as well as the gear 33 with respect to the transmission casing 9. A cylindrical boss 88 on the end of the bearing cage member 72 encircles the outer portion of the hub of companion flange 83 and is provided with suitable lubrication and dust sealing means, such as the grooves 89.

The driven shaft 53 extends the entire length of the transmission casing 9 and is rotatably supported at three spaced points. Two of the supporting bearings 51 and 71 have previously been described and the third bearing 91 is located adjacent the end of the shaft opposite the bearing 71 and is housed in the outer end of casing 9. Adjacent the bearing 91 and at the extreme outer end portion of shaft 53 is a speedometer gear 93 non-rotatably secured to said shaft by suitable means, such as key 95. The speedometer pinion gear 97 is rotatably journaled in transmission cover 99 in a suitable manner (not shown) and said cover is removably secured to casing 9 by means of capscrews 101.

The end of the shaft 53 adjacent the bearing 91 is splined as indicated at 102 and receives an internally splined slidable gear 103 which rotates with the shaft. A groove 104 in the hub of the gear receives a shifter fork 105 (Figure 7) by which the gear may be moved axially along the splines 102. Adjacent the gear 103 and abutting the ends of the splines 102 is a gear 107. This gear is free to rotate on the shaft 53 and includes a bearing bushing 105. Integral with the gear 107 and on the side adjacent the gear 47 on the sleeve 35 is a second gear 109 which is identical with the gear 47. Non-rotatably secured to shaft 53 by suitable means, such as a key 111, and adjacent the gear 109 is the portion 113 of a clutch 115. Said portion 113 and the gear 107 are longitudinally positioned on shaft 53 by means of a locking ring 116 inserted into a groove in the shaft. The portion 113 of the clutch 115 is externally splined and the internally splined slidable clutching member 118 of the clutch is slidable thereon. The clutch member 118 is provided with a groove 119 adapted to receive a shifter fork or similar device by means of which it may be moved axially. The external splines on the portion 113 are identical with the teeth of gears 47 and 109. Therefore, if the slidable member 118 of the clutch 115 is moved toward the left so that its internal splines mesh with the teeth of the gear 47, the sleeve 35 will be clutched to the shaft 53. If the slidable member of the clutch 115 is moved toward the right so that the teeth of the gear 109 are engaged by its internal splines, the gear 109 will be clutched to the shaft 53.

Parallel to and beneath the shaft 53 is a nonrotatable shaft 120 which is secured in suitable supports in the transmission casing 9 (Figure 7). A hollow member 121 is rotatably mounted on the shaft 120 by means of bearings 122 which are separated by a spacer 123. The hollow member 121 serves as a countershaft and is formed to provide four axially spaced integral gears. The first and largest of these gears 124 is adapted to be constantly in mesh with the gear 45 on sleeve 35. The second and smaller gear 125 is adapted to be in constant mesh with the gear 107. The third gear 127 is smaller than the gear 125 and is adapted to engage the gear 103 when it is shifted to the left as viewed in Figures 6 and 7. The smallest gear 129 is in constant mesh with an idler gear (not shown) which idler gear is adapted to mesh with gear 103 when it is shifted in the opposite direction to that required to mesh with gear 127. Thrust washers 130 and 132 are provided between the ends of the hollow member 121 and the transmission casing 9.

The shifter fork 105 for the gear 103 and the fork or other device which is engaged in the groove 119 to move the clutch member 118 are carried by slidable rods 133, one of which appears in Figure 7. The rods 133 are moved by the means designated generally by the reference character 134 which is under control of a lever 135. If the transmission is located in a vehicle at a point remote from the driver thereof, suitable remote control devices may be used to operate the lever 135.

It is to be understood that the particular arrangement of the speed-changing gears and also the means by which they are shifted may be revised to suit the particular desires or requirements of the user and such revisions are considered within the scope of the present invention. The arrangement shown herein is illustrative of one type of transmission embodying the present invention.

In operation, power from the engine is transmitted through the clutch in the casing 11 to the shaft 17 and thence through the bevel gears 19 and 33 to the sleeve 35 and the gear 45. In the position of the parts illustrated in Figure 7, no power can be transmitted to the main shaft 53, as the parts are in what is generally known as "neutral." To shift into first or low gear, gear 103 is moved toward the left as viewed on Figures 6 and 7 so that it meshes with the gear 127. Then the gear 45 will drive the gear 124, and the gear 127. The gear 127 being in mesh with the gear 103 drives the latter and the main shaft 53.

It is noted that the gears 45 and 127 are of less size than the gears 124 and 103 respectively with which they are in mesh, and hence a reduction in speed and increase in power is obtained.

Reversal of the direction of rotation of the shaft 53 is obtained by moving the sliding gear 103 to the right as viewed on Figure 7 so that it comes into mesh with the idler gear which is driven from the gear 129. The idler gear which is thus interposed in the gearing causes the gear 103 and main shaft 53 to be driven in the opposite direction of rotation.

When the vehicle has attained sufficient speed in low gear, the transmission is shifted to second or intermediate gear in the usual manner by manipulation of the clutch and the transmission control 135. To obtain the intermediate position of the transmission mechanism, gear 103 is moved toward the right out of mesh with the gear 127 and the sliding clutch member 118 is moved toward the right so that it overlaps the gear 109. In this position of the parts, power that is transmitted to the gear 124 by the gear 45 is transmitted through gears 125 and 107 to the shaft 53. It is to be noted that the gear 125 is larger than the gear 127 and that gear 107 is smaller than gear 103. Therefore, there will still be a reduction in speed of shaft 53 with respect to sleeve 35, but this speed reduction will not be as great as with the mechanism in low gear.

When the vehicle has attained sufficient speed in second gear, the mechanism is shifted into high gear or direct drive. This is accomplished by moving the clutch member 118 to the left out of mesh with gear 109 and into mesh with the gear 47. With the parts in this position, the gear 45 will still drive the gear 124, but the gear 107 which is driven by gear 125 will freely rotate on the shaft 53. Power then is transmitted directly from the gear 45 to the shaft 53 by means of the clutching engagement of the internal splines of the member 118 with the teeth 47. The shaft 53 will then rotate at the same speed as the sleeve 35.

While I have confined the description of the transmission mechanism of my invention to a transmission having its longitudinal axis at right angles to the power in-put shaft it is evident that this angle may be varied by changing the angularity of the bevel gearing 19 and 33. Such an arrangement is contemplated in the transmission mechanism 15 of Figures 4 and 5.

From the foregoing description it will be seen that by my present invention I provide a very compact transmission mechanism having a power in-put shaft, the axis of which is coincident with the longitudinal axis of the driving means, but which is other than parallel to or co-incidental with the longitudinal axis of the transmission. It is also evident that I have provided a transmission for use in a motor vehicle and particularly in a vehicle employing a transversely mounted motor at either end of the vehicle, in which the transmission bevel gearing is at the power in-put end of the transmission, thereby reducing the size of such gears and increasing their factor of safety.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the range of equivalency of the claims are therefore intended to be embraced therein.

What is claimed and desired to be secured by United States Letters Patent is—

1. In a change speed transmission comprising a pair of telescoped independently rotatable shafts, a driving shaft and a gear thereon, a driven gear on one of said telescoped shafts meshing with said driving gear, a casing for said transmission, a bearing housing mounted on said casing and a pair of bearings independently supporting said nested shafts within said housing, and means to permit adjustment of the position of said bearing housing in said casing whereby to simultaneously move said bearings and the telescoped shafts axially and thereby effect adjustment of the meshing engagement of said gears.

2. In a motor vehicle having drive wheels, and means for imparting a final drive thereto, a motor unit stationarily mounted upon said vehicle with its power output shaft arranged transversely of the vehicle, an anti-friction bearing rotatably supporting said output shaft; a longitudinally arranged transmission casing disposed adjacent said motor unit and receiving the output end of said shaft; gearing within said casing for interconnecting said output end with said final drive means; and means for supporting said transmission casing on said motor unit for oscillation about the axis of said output shaft to several positions of adjustment, whereby the transmission may be properly related to the final drive in any one of several stationary motor positions, said supporting means comprising a collar receiving the outer race of said bearing and permanently secured to the motor unit, a cylindrical surface on said collar concentric with the shaft, and a complemental cylindrical surface on said transmission casing.

3. In a vehicle having a body structure, an unsprung drive axle and an engine supported by said body structure substantially in parallelism and in close proximity to said axle, a change speed transmission mounted on the body structure with its axis forming an acute angle with the engine axis, and a flexible propeller shaft substantially aligned with said transmission and interconnecting the latter with said axle, said transmission being intersected approximately midway of its ends by the engine axis, and the propeller shaft extending from an off-center point on the axle to one end of said transmission at a point substantially as far from the axle as is the engine.

4. In a vehicle, a body structure, a drive axle, an engine mounted on said body structure with its shaft extending transversely thereof and in close proximity to said axle, a clutch housing secured to one end of said engine, a transmission casing mounted on said clutch housing with its longitudinal axis at an angle to said engine shaft and extending on the opposite side of said engine from said axle, said casing being adjustable angularly about the axis of said engine shaft, a transmission shaft arranged longitudinally of said casing and operatively connected to said engine shaft, a power take-off shaft mounted in said casing and extending from a wall thereof adjacent to said engine, gearing in said transmission casing connecting said take-off shaft to said transmission shaft, and a flexible propeller shaft of substantial length connected to said take-off shaft and to said axle.

5. In a vehicle, a body structure, a drive axle, an engine mounted on said body structure with its shaft extending transversely thereof and in close proximity to said axle, a clutch housing secured to one end of said engine, a transmission casing mounted on said clutch housing with its longitudinal axis at an angle of approximately 45° to said engine shaft and extending on the opposite side of said engine from said axle, said casing being adjustable angularly about the axis of said engine shaft, a transmission shaft arranged longitudinally of said casing and operatively connected to said engine shaft, a power take-off shaft mounted in said casing and extending from an end thereof adjacent to said engine, gearing in said transmission casing connecting said take-off shaft and said transmission shaft, and a flexible propeller shaft of substantial length connected to said take-off shaft and said axle and extending in axial alignment with said transmission shaft.

L. RAY BUCKENDALE.